(12) United States Patent
Hentschel et al.

(10) Patent No.: US 11,560,633 B2
(45) Date of Patent: Jan. 24, 2023

(54) ELECTROCHEMICAL PRODUCTION OF CARBON MONOXIDE AND/OR SYNGAS

(71) Applicants: Siemens Energy Global GmbH & Co. KG, Munich (DE); Linde GMBH, Pullach (DE)

(72) Inventors: Benjamin Hentschel, Munich (DE); Andreas Peschel, Wolfratshausen (DE); Marc Hanebuth, Nuremberg (DE); Günter Schmid, Hemhofen (DE); Dan Taroata, Erlangen (DE)

(73) Assignees: Siemens Energy Global GmbH & Co. KG, Munich (DE); Linde GMBH, Pullach (DE)

( * ) Notice: Subject to any disclaimer, the term of this patent is extended or adjusted under 35 U.S.C. 154(b) by 0 days.

(21) Appl. No.: 16/964,237

(22) PCT Filed: Jan. 18, 2019

(86) PCT No.: PCT/EP2019/051246
§ 371 (c)(1),
(2) Date: Jul. 23, 2020

(87) PCT Pub. No.: WO2019/158305
PCT Pub. Date: Aug. 22, 2019

(65) Prior Publication Data
US 2020/0399766 A1 Dec. 24, 2020

(30) Foreign Application Priority Data
Feb. 15, 2018 (DE) ...................... 10 2018 202 344.1

(51) Int. Cl.
*C25B 1/04* (2021.01)
*C25B 9/19* (2021.01)
(Continued)

(52) U.S. Cl.
CPC .................. *C25B 1/04* (2013.01); *C25B 1/23* (2021.01); *C25B 9/05* (2021.01); *C25B 9/19* (2021.01);
(Continued)

(58) Field of Classification Search
CPC ......... C25B 1/23; C25B 15/08; C25B 15/083; C25B 15/087
See application file for complete search history.

(56) References Cited

U.S. PATENT DOCUMENTS

2005/0066813 A1   3/2005  Dunn
2014/0131217 A1*  5/2014  Buschmann ............ C01B 11/06
                                                                    205/440
(Continued)

FOREIGN PATENT DOCUMENTS

CN        1600686 A       3/2005
CN     102181876 A       9/2011
(Continued)

OTHER PUBLICATIONS

Kortlever et al. 2012, DOI 10.1021/acs.jpclett.5b01559; J. Phys. Chem. Lett. 2015, 6, 4073-4082; 2012.
(Continued)

*Primary Examiner* — Ciel P Contreras
(74) *Attorney, Agent, or Firm* — Wolter Van Dyke Davis, PLLC

(57) ABSTRACT

An electrolysis system and an electrolysis method wherein the electrolysis system includes a pressure-electrolytic cell and a throttle in the catholyte line, by which the catholyte flow can be divided into a gas and liquid phase. In this way, (by-)products of the electrolysis can be recycled, while the electrolytic cell can be operated effectively at a high pressure.

8 Claims, 2 Drawing Sheets

(51) Int. Cl.
*C25B 9/05* (2021.01)
*C25B 15/08* (2006.01)
*C25B 1/23* (2021.01)

(52) U.S. Cl.
CPC ............ *C25B 15/08* (2013.01); *C25B 15/083* (2021.01); *C25B 15/087* (2021.01)

(56) References Cited

U.S. PATENT DOCUMENTS

2014/0291163 A1* 10/2014 Kanan ................. C25B 3/25
205/555
2018/0023198 A1   1/2018 Graetzel

FOREIGN PATENT DOCUMENTS

| CN | 107208284 A | 9/2017 |
|---|---|---|
| DE | 102013226357 A1 | 6/2015 |
| EP | 2940773 A1 | 11/2015 |
| WO | 2013131778 A2 | 9/2013 |
| WO | 2014154253 A1 | 10/2014 |
| WO | 2015014527 A1 | 2/2015 |
| WO | 2016124300 A1 | 8/2016 |
| WO | 2016128323 A1 | 8/2016 |
| WO | 2018001636 A1 | 1/2018 |

OTHER PUBLICATIONS

Ê.J.Dufek et al.; "Operation of a pressurized system for continuous reduction of CO2"; J. Electrochemical Society, 159(9) F514-F517, 2012; 2012.
Charles Delacourt et al: "Design of an Electrochemical Cell Making Syngas (CO+H2) from C02 and H20 Reduction at Room Temperature", Journal of the Electrochemical Society, Bd. 155, Nr. 1, Seite B42, XP055124598, ISSN: 0013-4651, DOI: 10.1149/1.2801871 Zusammenfassunq; Seite B45, Spalte 2; Abbildung 3b; 2008.
PCT International Search Report and Written Opinion of International Searching Authority dated Mar. 21, 2019 corresponding to PCT International Application No. PCT/EP2019/051246 filed Jan. 18, 2019.

* cited by examiner

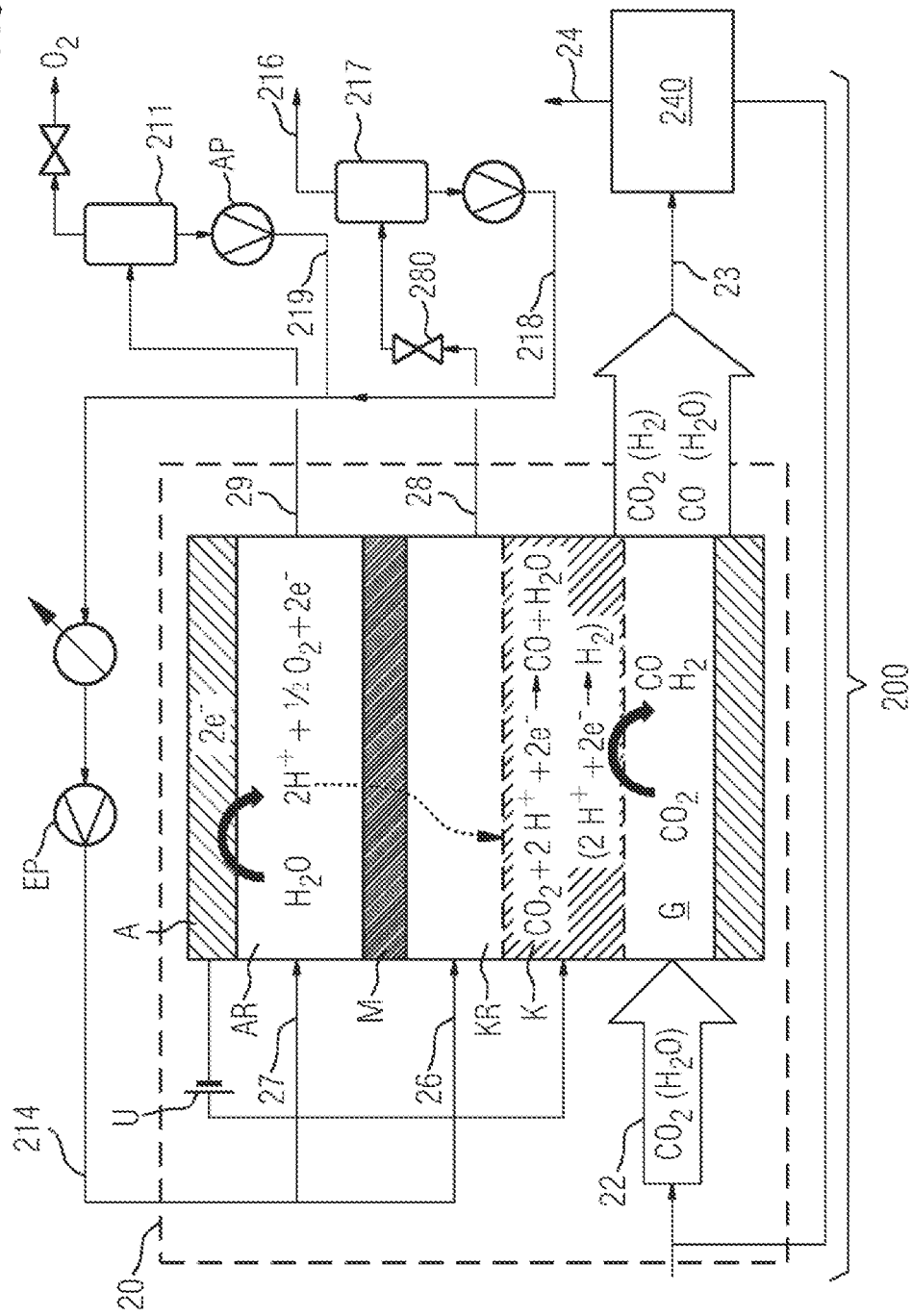

ELECTROCHEMICAL PRODUCTION OF CARBON MONOXIDE AND/OR SYNGAS

CROSS REFERENCE TO RELATED APPLICATIONS

This application is the US National Stage of International Application No. PCT/EP2019/051246 filed 18 Jan. 2019, and claims the benefit thereof. The International Application claims the benefit of German Application No. DE 10 2018 202 344.1 filed 15 Feb. 2018. All of the applications are incorporated by reference herein in their entirety.

FIELD OF INVENTION

The present invention relates to an electrolysis system and to an electrolysis method for production of carbon monoxide and/or synthesis gas.

BACKGROUND OF INVENTION

Carbon Monoxide Production

Carbon monoxide can nowadays be produced by various methods. Examples of these are the steam reforming of natural gas, in which carbon monoxide is formed as well as hydrogen. It is also possible to obtain carbon monoxide via the gasification of various feedstocks such as coal, mineral oil or natural gas and the subsequent purification thereof.

Carbon monoxide can also be synthesized electrochemically from carbon dioxide. This is possible, for example, in a high-temperature electrolysis cell SOEC (solid oxide electrolysis cell). Oxygen is formed here on the anode side and carbon monoxide on the cathode side according to the following reaction equation: $CO_2 \rightarrow CO + \frac{1}{2}O_2$.

The mode of function of the SOEC and various process concepts are described, for example, in the patent literature WO2014/154253A1, WO2013131778, WO2015014527, EP2940773A1. The SOEC is mentioned here together with a possible carbon dioxide-carbon monoxide separation by means of absorption, membrane, adsorption or cryogenic separation. However, there is no disclosure of the exact configuration and possible combinations of the separation concepts.

Synthesis Gas Production

The SOEC can also be operated with water and carbon dioxide as feedstock, called the feed, by means of which synthesis gas can be produced electrochemically. Synthesis gas is understood to mean a mixture of carbon monoxide and hydrogen. The electrolysis is then what is called a co-electrolysis. The "co-" relates here to the use of two feeds, namely water and carbon dioxide.

The electrochemical production of carbon monoxide from carbon dioxide is also possible by a low-temperature electrolysis in the aqueous electrolyte, as described in Delacourt et al. 2008, DOI 10.114911.2801871. The following reactions, for example, proceed here:

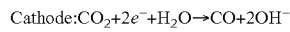

Cathode: $CO_2 + 2e^- + H_2O \rightarrow CO + 2OH^-$

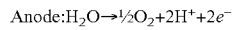

Anode: $H_2O \rightarrow \frac{1}{2}O_2 + 2H^+ + 2e^-$

The proton $H^+$ migrates here through a proton exchange membrane (PEM) from the anode side to the cathode side. The formation of hydrogen also proceeds to some degree at the cathode: $2H_2O + 2e^- \rightarrow H_2 + 2OH^-$ According to the construction of the electrolysis cell, it is also possible for cations other than protons (e.g. $K^+$) that are present in the electrolyte to be conducted. What is called an anion exchange membrane (AEM) may likewise be utilized depending on the construction. Similarly to the case of the high-temperature electrolysis, it is possible to produce either primarily carbon monoxide or synthesis gas.

Depending on the use of a suitable catalyst, it is also possible to form other products of value. An overview of the mode of function and reactions is given by the patent literature WO2016124300A1 or WO2016128323A1, or else the scientific literature Kortelever et al. 2012, DOI 10.1021/acs.jpclett.5b01559. Operation of low-temperature electrolysis under elevated pressure is likewise mentioned in the literature: Dufek et al. 2012, DOI 10.1149/2.011209jes. The focus here is on the efficiency and the currents to be attained.

In all the production methods described, the problem is that residues of carbon dioxide, carbon monoxide and hydrogen remain in the oxygen stream and are lost in that way. However, this problem is neither industrially solved nor even identified as such.

Consequently, it is an industrial necessity to propose an improved solution for carbon monoxide and synthesis gas production that avoids the disadvantages known from the prior art. More particularly, the solution to be proposed is to avoid the gas losses described.

SUMMARY OF INVENTION

These objects underlying the present invention are achieved by an electrolysis system and by an electrolysis method according to the independent claims. Advantageous configurations of the invention are the subject of the dependent claims.

The electrolysis system according to the invention for production of carbon monoxide and/or synthesis gas comprises a pressure electrolysis cell, a catholyte inlet that leads into the pressure electrolysis cell, and a catholyte outlet that leads out of the pressure electrolysis cell. A pressure electrolysis cell is understood to mean an electrolysis cell that can be operated within a pressure range above 500 mbar.

The catholyte outlet opens into a catholyte conduit having a throttle device and a phase separator that divides the catholyte conduit into a catholyte gas conduit and a catholyte liquid conduit.

By means of this electrolysis system, it is possible to operate a low-temperature electrolysis at high working pressure without losing significant amounts of hydrogen, carbon monoxide or carbon dioxide with the oxygen stream, since the catholyte can be expanded again subsequent to the electrolysis, i.e. can be brought to a lower pressure. By the expansion of the catholyte, it is subsequently possible to remove physically dissolved gases.

The invention also has the advantage of being equally usable for carbon monoxide production and for synthesis gas production in a low-temperature co-electrolysis. In the case of co-electrolysis too, a high electrolysis pressure has advantages for the separation of any carbon dioxide present from the catholyte.

The throttle device may have, for example, a controllable valve and/or a pressure reducer.

In an advantageous configuration of the invention, the catholyte gas conduit opens into a recycle compressor. This recycle compressor performs a pressure increase that enables recycling of the gas obtained in the expansion of the catholyte stream into the electrolysis cell as reactant.

This embodiment has the particular advantage that, by means of the gas separation, physically dissolved (by-)product gases can be recovered from the catholyte stream, while the production of pure carbon monoxide is enabled since a mixture of carbon monoxide, carbon dioxide and hydrogen always forms in the electrolyzer.

If the recycle compressor comprises the phase separator, this accordingly first achieves the removal of the reusable carbon dioxide gas, and secondly fulfills the compressor function needed since the pressure in the gas separation is lower than in the electrolysis cell.

Advantageously, carbon monoxide is separated from the catholyte stream and also from the product gas stream when it is guided out of a reaction space on the reverse side of the cathode of the electrolysis cell. For this purpose, a second recycle compressor is then advantageously provided.

In this embodiment, the cathode is configured, for example, as a gas diffusion electrode. In this example, carbon dioxide removed is fed back to the carbon dioxide feed, the reactant inlet of the electrolysis cell.

The electrolysis method according to the invention serves to produce carbon monoxide and/or synthesis gas. Synthesis gas is understood to mean a mixture of hydrogen and carbon monoxide, with a variable ratio according to the application. Thus, carbon monoxide gas that also contains small amounts of hydrogen, just like hydrogen gas that also contains small amounts of carbon monoxide, already constitutes a synthesis gas. Typical molar ratios of hydrogen to carbon monoxide, however, are in the range from 1:3 to 3:1.

In one method step, the gas-laden catholyte stream is expanded. Thus, in the electrolysis step, it is possible to work within a relatively high pressure range and then to reduce the pressure again. The expanded catholyte stream is then freed to a large degree of previously dissolved hydrogen, carbon monoxide and carbon dioxide.

By means of this method, it is possible to use a low-temperature electrolysis and to work at a high pressure level. The pressure in the electrolysis cell may be between 500 mbar and 100 bar. An advantageous working range is between 5 bar and 50 bar, especially between 20 bar and 40 bar.

By virtue of the high working pressure level, the gas no longer necessarily has to be compressed prior to the removal of the desired electrolysis products. This has the advantage of saving apparatus and energy.

For removal of the desired electrolysis products, an advantage is given to feeding the gas stream separated from the catholyte stream into a recycle compressor in which a gas separation is undertaken, which avoids gas losses.

In an illustrative variant of the electrolysis method, the liquid stream that has been freed of gas is brought back to the operating pressure that prevails in the electrolysis cell. This is especially above 5 bar, for example even within a high pressure range above 20 bar. This is then followed again by combination with the anolyte stream.

In a further illustrative variant of the electrolysis method, the gas-laden anolyte stream is freed of oxygen by means of a gas-liquid separation. The gas-liquid separation can be effected, for example, by means of standard methods.

In this variant, the pressure is not reduced, such that only the proportion of the oxygen above the solubility limit can be removed. However, as a result there is barely any hydrogen, carbon monoxide and carbon dioxide in the oxygen stream.

In a variant of the electrolysis method, the anolyte stream that has been freed of oxygen is combined again with the catholyte stream.

The effect of the intermediate expansion on the composition of the offgas stream is illustrated in table 1:

| Pressure (3) [bara] | Temperature (3) [° C.] | Spec. electrolyte flow rate (14) [t/Nm$^3_{CO}$] | $O_2$ vent (10) ($H_2$/CO/$CO_2$) [mol %] | Spec. $CO_2$ consumption (1) [Nm$^3_{CO2}$/ Nm$^3_{CO}$] |
|---|---|---|---|---|
| 2 | 35 | 0.6 | 0/0.3/13 | 1.3 |
| 2 | 60 | 0.6 | 0/0.2/8 | 1.3 |
| 20 | 35 | 0.8 | 0.3/3/42 | 1.7 |
| 20 | 60 | 0.7 | 0.3/2/36 | 1.6 |
| 2 with intermediate expansion | 35 | | | |
| 2 with intermediate expansion | 60 | | | |
| 20 with intermediate expansion | 35 | 0.6 | 0/0/7 | 1.2 |
| 20 with intermediate expansion | 60 | 0.6 | 0/0/6 | 1.2 |

The present invention additionally has the advantage of offering a means of carbon dioxide utilization. Currently about 80% of global energy demand is covered by the combustion of fossil fuels, and the processes of combustion thereof cause a global emission of about 34 000 million tons of carbon dioxide into the atmosphere per year. It is by this release into the atmosphere that the majority of carbon dioxide is currently disposed of, which, for example in the case of a brown coal power plant, can amount to up to 50 000 tons per day. Carbon dioxide is one of what are known as greenhouse gases, the adverse effects of which on the atmosphere and the climate are a matter of discussion. Since carbon dioxide is thermodynamically very stable, it can be reduced to reutilizable products only with difficulty, which has to date prevented the reutilization of carbon dioxide on relevant scales.

Natural carbon dioxide degradation is effected, for example, by photosynthesis. This involves conversion of carbon dioxide to carbohydrates in a process which is subdivided into many component steps over time and in space at the molecular level. As such, this process is not easily adaptable to the industrial scale, and a copy of the natural photosynthesis process with industrial scale photocatalysis does not have adequate efficiency to date.

In a further advantageous variant of the electrolysis method, the gas phase that forms at the cathode, especially in the catholyte, is introduced back into the electrolysis cell. Physically dissolved gas can be removed from the catholyte by lowering the pressure thereon. The gas phase that forms in the catholyte contains, for example, primarily carbon dioxide with smaller amounts of carbon monoxide and hydrogen gas. This is advantageously, for instance in its entirety, fed back into the electrolysis cell together with the carbon dioxide feed once it has been brought back to the operating pressure of the electrolyzer, if amounts of hydrogen present are small or hydrogen can be separated efficiently in the gas separation or hydrogen in the product gas is not disruptive.

In a further advantageous variant of the electrolysis method, the gas mixture removed after the expansion is guided directly into the gas separation.

The invention is also applicable to unmixed or only partly mixed electrolytes.

In a further advantageous variant of the electrolysis method, the waste heat from the electrolysis is removed via the electrolyte stream. The efficiency of the electrolysis is, for example, between about 40% and 80%. The amount of waste heat formed is removed via the electrolyte circuit. Limitation of the temperature increase in the electrolysis cell by a few kelvin then results in a relatively high electrolyte flow rate.

BRIEF DESCRIPTION OF THE DRAWINGS

For illustrative elucidation of the present invention, FIGS. 1 and 2 of the appended drawing are now described:

FIG. 2 shows an electrolysis system of an embodiment herein.

DETAILED DESCRIPTION OF INVENTION

Figure 1:
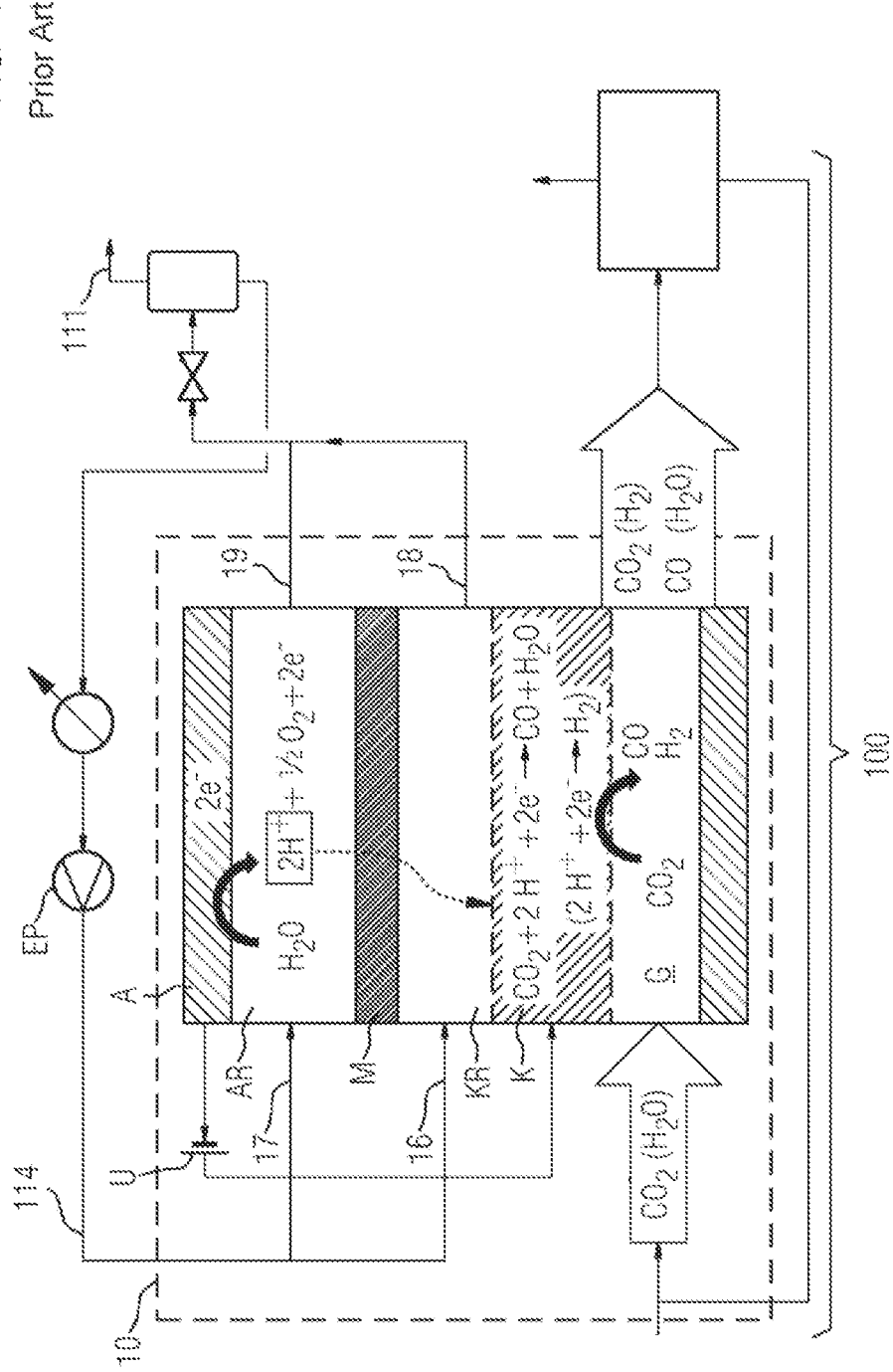
FIG. 1 shows an electrolysis system of the prior art.

The figures each show an electrolysis system 100, 200 with mixed electrolyte circuit 114, 214. The catholyte 16, 26 is fed into the cathode space KR, and the anolyte 17, 27 into the anode space. A membrane M, for example an ion exchange membrane or else a porous membrane, also called diaphragm, ensures charge transport by exchange of the ionic charge carriers. The figures show the passage of the protons $H^+$ by means of a dotted arrow. The membrane M also ensures that no mixing of the gases that form at anode A and cathode K takes place. In order to avoid any difference in concentration of the types of ions between anolyte and catholyte, the electrolyte streams 18, 28 and 19, 29 are advantageously combined in the low-temperature electrolysis and divided again on completion of mixing.

The gas-laden electrolyte streams 18, 28 and 19, 29 are subjected to a gas-liquid separation 211 in the examples shown. For example, the liquid electrolyte stream is also cooled in order to remove the waste heat from the electrolysis cell 10, 20. What is called a make-up stream of electrolyte is supplied to the electrolyte circuit 114, 214 after the gas removal 211 in order to compensate for electrolyte losses.

In the electrolysis method known from the prior art which is shown in FIG. 1, the oxygen content in the anolyte rises as a result of the anode reaction, such that this oxygen has to be removed again from the departing anolyte stream 19, advantageously by means of a gas-liquid separation. As a result of the contact of the (departing) catholyte 18 with the gas channel G via the gas diffusion cathode K, hydrogen, carbon monoxide and carbon dioxide also get into the catholyte 18. In the gas-liquid separation, these are then lost from the electrolysis system 100 via the oxygen stream 111. Low-temperature electrolysis at elevated pressure could thus become uneconomic. Recovery of hydrogen, carbon monoxide and carbon dioxide from the oxygen stream 111 would likewise be inefficient.

FIG. 2 shows an electrolysis system 200 as would be usable for execution of the invention: a common electrolyte circuit 214 is present, which is only split into anolyte inlet 27 and catholyte inlet 26 before entry into the electrolysis cell 20. The electrolytes used are pumped continuously through the electrolysis cell 20, i.e. through the anode space AR and through the cathode space KR in each case. For this purpose, the electrolyte cycle 214 has at least one electrolyte pump EP.

An anode A is disposed in the anode space AR and a cathode K in the cathode space KR, which are electrically connected via a voltage source U. The cathode K is advantageously configured as a gas diffusion electrode. Anode space AR and cathode space KR are separated from one another by a cation-permeable membrane M in order to be able to withdraw reduction and oxidation (by-)products separately from one another through the anolyte outlet 29 and catholyte outlet 28.

The electrolysis reactions are marked correspondingly at the respective electrodes in the electrolysis cell 20. The carbon dioxide reduction takes place in the gas channel G on the reverse side of the cathode K, configured as a reaction space. As a result of the configuration of the cathode K as gas diffusion electrode, the products remain separate from the catholyte and can be withdrawn from the product outlet 23 of the electrolysis cell 20.

The product outlet 23 of the electrolysis cell 20 opens into a gas separation, advantageously into a downstream process 240. Carbon dioxide is fed back to the carbon dioxide feed 22. This is possible with particular efficiency when only small amounts of hydrogen are present or the hydrogen content in the gas separation 240 has been successfully minimized. The actual product after the combination of electrolysis 20 and gas separation 240 is then discharged 24.

Before catholyte outlet 28 and anolyte outlet 29 are combined again to give the electrolyte stream 214, these are freed of (by-)products from the electrolysis. These are frequently gases which, as a result of the working pressure in the electrolysis cell 20, are physically dissolved in the electrolyte. However, it is possible to remove the oxygen from the anolyte stream 29 by means of phase separation 211, since the vast majority of this is not dissolved in the liquid phase but is already in the gas phase. An anolyte pump AP, for instance, conveys the anolyte stream 219 that has been freed of oxygen back into the electrolyte circuit 214.

The catholyte outlet 28 has a throttle device 280 that reduces the pressure in the onward catholyte conduit 28. This results in expansion of the catholyte stream 28. A phase separator 217 divides the catholyte stream 28 into gas phase 216 and liquid phase 218. The catholyte liquid 218 is fed back to the electrolyte circuit 214. The catholyte gas stream 216 can then be fed to a recycle compressor. It may be advisable to route this gas 216 in its entirety back into the electrolyzer 20 together with the carbon dioxide feed 22. For this purpose, it is brought back to the operating pressure of the electrolysis cell 20, for example by means of a pump. This is possible with particular efficiency when only small amounts of hydrogen are present or the hydrogen content can be efficiently removed in the gas separation 240, for example in a downstream process.

The invention claimed is:

1. An electrolysis method for production of carbon monoxide and/or synthesis gas using an electrolysis system, wherein the electrolysis system comprises: a pressure electrolysis cell, an anolyte outlet configured to deliver a gas-laden anolyte stream out of the pressure electrolysis cell, a catholyte inlet that leads into the pressure electrolysis cell, a catholyte outlet configured to deliver a gas-laden catholyte stream out of the pressure electrolysis cell, and a product gas outlet configured to deliver carbon monoxide or a synthesis gas out of the pressure electrolysis cell, wherein the catholyte outlet opens into a catholyte conduit comprising a throttle device and then a phase separator that divides the catholyte conduit into a catholyte gas conduit and a catholyte liquid conduit, the method comprising:
   introducing reactants into the pressure electrolysis cell and reducing at a cathode,
   delivering the gas-laden catholyte stream from the catholyte outlet, and
   reducing a pressure on the gas-laden catholyte stream in order to form a gas phase in the gas-laden catholyte stream.

2. The electrolysis method as claimed in claim 1, further comprising:
   separating the gas phase in the gas-laden catholyte stream from a liquid phase in the gas-laden catholyte stream into a catholyte gas stream and a catholyte liquid stream respectively via the phase separator, and
   feeding the catholyte gas stream into a recycle compressor.

3. The electrolysis method as claimed in claim 2, further comprising bringing the catholyte liquid stream to a pressure above 2 bar and then combining the catholyte liquid stream with an anolyte stream that has been freed of oxygen.

4. The electrolysis method as claimed in claim 3, further comprising freeing the gas-laden anolyte stream exiting the anolyte outlet of oxygen by means of a gas-liquid separation to produce the anolyte stream that has been freed of oxygen.

5. The electrolysis method as claimed in claim 4, further comprising combining the anolyte stream that has been freed of oxygen with the catholyte liquid stream to give an electrolyte stream that is fed into the pressure electrolysis cell.

6. The electrolysis method as claimed in claim 5,
   wherein an entire gas phase that forms at the cathode is introduced back into the pressure electrolysis cell.

7. The electrolysis method as claimed in claim 6, further comprising, guiding the gas-laden catholyte stream directly into the phase separator after the pressure on the gas-laden catholyte stream is reduced.

8. The electrolysis method as claimed in claim 7,
   wherein waste heat from the electrolysis is removed via the electrolyte stream.

* * * * *